United States Patent [19]

Blanchet

[11] Patent Number: 5,723,924
[45] Date of Patent: Mar. 3, 1998

[54] MOTORIZED REDUCTION GEAR UNIT, ESPECIALLY FOR DRIVING A VEHICLE SCREEN WIPER APPARATUS

[75] Inventor: Pierre Blanchet, Lencloitre, France

[73] Assignee: Valeo Systemes D'Essuyage, La Verriere, France

[21] Appl. No.: 598,237

[22] Filed: Feb. 7, 1996

[30] Foreign Application Priority Data

Feb. 8, 1995 [FR] France ................................. 95 01537

[51] Int. Cl.⁶ .................................................. H02K 5/04
[52] U.S. Cl. .................. 310/85; 310/83; 310/88; 310/68 R; 310/71; 310/89
[58] Field of Search ....................... 310/83, 85, 88, 310/89, 71, 91, 68 R

[56] References Cited

U.S. PATENT DOCUMENTS

| | | | |
|---|---|---|---|
| 4,568,995 | 2/1986 | Mushenski | 310/221 |
| 4,614,886 | 9/1986 | Schneider et al. | 310/83 |
| 4,710,657 | 12/1987 | Ocken et al. | 310/62 |
| 4,712,441 | 12/1987 | Abraham | 74/89.15 |
| 4,727,274 | 2/1988 | Adam et al. | 310/89 |
| 4,963,778 | 10/1990 | Jensen et al. | 310/68 D |
| 5,063,317 | 11/1991 | Bruhn | 310/91 |
| 5,140,207 | 8/1992 | Baumeister et al. | 310/83 |
| 5,194,769 | 3/1993 | Ade et al. | 310/51 |
| 5,208,728 | 5/1993 | Schirmer | 361/380 |
| 5,245,237 | 9/1993 | Fisher et al. | 310/89 |
| 5,315,194 | 5/1994 | Brusasco et al. | 310/68 R |
| 5,473,111 | 12/1995 | Hattori et al. | 174/35 |
| 5,483,485 | 1/1996 | Thoma et al. | 310/49 |

FOREIGN PATENT DOCUMENTS

| | | | |
|---|---|---|---|
| 252 481 | 1/1988 | European Pat. Off. | H02K 11/00 |
| 38 38 285 | 5/1990 | Germany | H02K 5/00 |
| 41 16 100 | 11/1992 | Germany | H02K 11/00 |
| 2 140 218 | 11/1984 | United Kingdom | H02K 5/02 |
| 91/03856 | 3/1991 | WIPO | H02K 23/66 |

*Primary Examiner*—Thomas M. Dougherty
*Assistant Examiner*—B. Mullins
*Attorney, Agent, or Firm*—Morgan & Finnegan LLP

[57] ABSTRACT

A motorised reduction gear unit, especially one for driving screen wipers of a vehicle, includes a hollow gearbox casing which is closed by a closure plate. At least a portion of the external surface of the closure plate is electrically conductive. The unit also includes an electronic suppressor comprising a group of electronic components arranged on the conductive portion of the external surface of the closure plate. The suppressor components are enclosed by a housing of generally cap-like configuration, which is electrically conductive. The housing includes at least one means for connecting it electrically with the conductive portion of the external surface of the closure plate.

14 Claims, 3 Drawing Sheets

MOTORIZED REDUCTION GEAR UNIT, ESPECIALLY FOR DRIVING A VEHICLE SCREEN WIPER APPARATUS

FIELD OF THE INVENTION

The present invention relates to a motorised reduction gear unit, especially one of the kind adapted to drive a screen wiper apparatus for a vehicle. More particularly, it relates to such a unit which has an electric motor adapted to drive the screen wipers of a motor vehicle at two different speeds.

BACKGROUND OF THE INVENTION

In a motorised reduction gear unit of this kind it is generally necessary to provide antiparasitic suppression means, for attenuating the electromagnetic perturbations, or parasitic "noise", emitted by the motor while the latter is working.

The antiparasitic suppressors that are generally used in the current state of the art consist of groups of components comprising two inductive coils (inductances and two capacitors. Each coil is connected between the power supply brush of the motor appropriate to high-speed or low-speed running of the motor, and the source of electrical power for the motor. Each capacitor is connected between a respective one of the brushes and ground.

The inductive coils suppress the emission of noise in the FM waveband (i.e. at frequencies in the approximate range 70–110 MHz), or at higher frequencies, while the capacitors suppress noise emissions at short-wave frequencies (about 6 to 28 MHz) and medium-wave frequencies (0.5 to 1.6 MHz). It is also known to add a third capacitor which is connected between the two power supply brushes of the motor, in order to suppress noise emissions in the lowest frequency bands, i.e. in the long-wave banal of about 150–300 Hz.

The mounting of the antiparasitic components in the casing of the motor itself gives rise to a certain number of problems. In this connection, current practice is typically to arrange these components on the support plate which carries the carbon brushes of the motor. However, very little space is available for this purpose on the support plate.

In addition, the most recent standards for suppression of parasitic noise emissions call for suppression of these emissions up to about 1 GHz, because these high frequency wavebands are now reserved for use by radio-telephones or cellular telephones of the GSM type.

In order to achieve these results, it is necessary to use a supplementary coil, connected in series with the first coil, for each power supply brush of the motor (i.e. one brush for high speed, one for low speed). This supplementary coil adds to the number of components, and makes it virtually impossible to mount them all on the brush support plate.

It has previously been proposed, in particular in the International patent specification No. WO91/03856, that the suppressor components should be arranged in a housing formed in the casing of the reduction gearbox of the unit. This housing is closed by the closure or cover plate of the gearbox casing. A disadvantage of this arrangement arises from the fact that the dimensioning of such a housing, and therefore also that of the electronic components, must be settled while the gearbox casing is being designed. In order to avoid too much space being taken up by the reduction gear unit, the suppressor components are in general disposed in a cavity situated on the outside of the closure plate of the gearbox. The closure plate is usually made of a plastics material, and the cavity containing the suppressor components is overlaid with a cover, which is again made of a plastics material.

Another problem arises during use of a reduction gear unit arranged in this way, because the suppressor components themselves emit parasitic radiation which is not arrested or attenuated by the plastics housing in which they are mounted. In this connection, the suppressor components receive a signal containing electromagnetic noise at high frequencies, and they behave as antennae, so that they retransmit the noise into the environment.

DISCUSSION OF THE INVENTION

A main object of the present invention is to overcome the foregoing problems.

According to the invention, in a motorised reduction gear unit, especially for driving a screen wiper apparatus for a vehicle, in which the said unit comprises a hollow gearbox casing closed by a closure plate, at least a portion of an external surface of the closure plate being electrically conductive, the unit further including electronic components such as antiparasitic components, which are disposed on the said electrically conductive portion of the external surface of the closure plate, the electronic components are enclosed by a generally cap-shaped housing of electrically conductive material, with the housing including at least one electrical connecting means for connection with the said conductive portion of the closure plate external surface.

With the apparatus according to the invention, electromagnetic radiation emitted by the suppressor, or antiparasitic components, is retained within the electrically conductive cavity which is defined by the housing disposed on the closure plate of the gearbox casing.

According to a preferred feature of the invention, the closure plate is of metallic material.

According to another preferred feature of the invention, the housing in which the electronic components are enclosed is of a metallic material.

According to a further preferred feature of the invention, the said housing is of a synthetic material such as a plastics material), and has a thin electrically conductive layer disposed on at least one surface of the housing. Preferably this thin conductive layer is disposed on an internal surface of the housing.

In preferred arrangements according to the invention, a connecting means, for making an electrical, connection between the housing and the conductive portion of the closure plate external surface, comprises at least one rectilinear projection disposed on the said conductive portion so as to be in contact with at least one side wall of the said housing.

In such an arrangement, the closure plate preferably has on its outer surface two said rectilinear projections, substantially parallel to each other and so disposed as to be in contact, respectively, with two side walls of the housing. These rectilinear projections are preferably disposed inside the housing.

According to yet another preferred feature of the invention, the unit includes electrical connecting means, connecting the housing with the conductive portion of the closure plate external surface and comprising an electrically conductive lug projecting from the housing, the said lug being fixed on the said conductive portion of the closure plate external surface.

According to a still further preferred feature of the invention, the electronic components are disposed on a mounting plate of electrically insulating material, the mounting plate including a plurality of metallic sectors which provide electrical connections for the said components. Preferably, the mounting plate carrying the electronic components is disposed inside the housing, the interior of the housing being filled with an insulating resin so that the mounting plate and the said components are encapsulated in the resin. In that case, one of the metallic sectors of the support plate is preferably extended beyond the latter by a lug having a hole therein and connected electrically to the housing.

In the latter case, and where the unit includes, as mentioned above, electrical connecting means connecting the housing with the conductive portion of the closure plate external surface and comprising an electrically conductive lug projecting from the housing, the said lug being fixed on the said conductive portion of the closure plate external surface, the closure plate preferably includes, in the said electrically conductive portion of its external surface, a support post having a hole for receiving a screw, the said lug that projects from the housing having a further hole therein and being in contact with the lug that extends a sector of the support plate, these two lugs being secured by the screw to the support post.

The motorized reduction gear unit also includes an electric motor. According to another preferred feature of the invention, where the motor has a casing with one open end covered by an intermediate member which contains a support plate carrying the power supply brushes of the motor, the intermediate member being joined to the hollow gearbox casing, at least one of the metallic sectors of the mounting plate is extended beyond the mounting plate by a tongue inserted in an aperture in the intermediate member and soldered on to the said support plate that carries the brushes.

According to a further preferred feature of the invention, where the motor is arranged for driving a screen wiper apparatus of a vehicle selectively at two different speeds, each of two said metallic sectors of the mounting plate is extended beyond the mounting plate by a respective tongue, with each said tongue being received in an aperture in an intermediate member joined to the gearbox casing and disposed between the latter and the motor, each said tongue being soldered to a support plate that carries the brushes, in such a way that each said tongue is electrically connected to a respective high-speed or low-speed brush of the motor.

Further features and advantages of the invention will appear from the following detailed description, of a preferred embodiment of the invention, given by way of example only. For an understanding of this detailed description, reference will be made to the attached drawings.

DESCRIPTION OF A PREFERRED EMBODIMENT OF THE INVENTION

Figure 1:
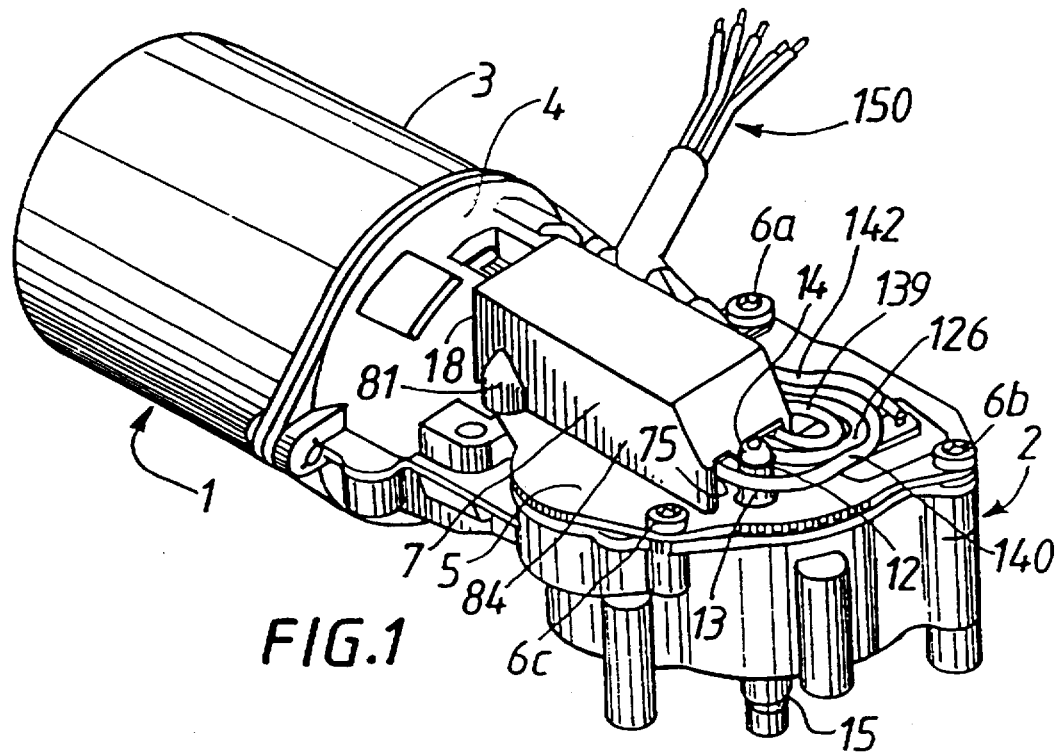
FIG. 1 is a perspective view of a motorised reduction gear unit in accordance with the invention.
Figure 2:
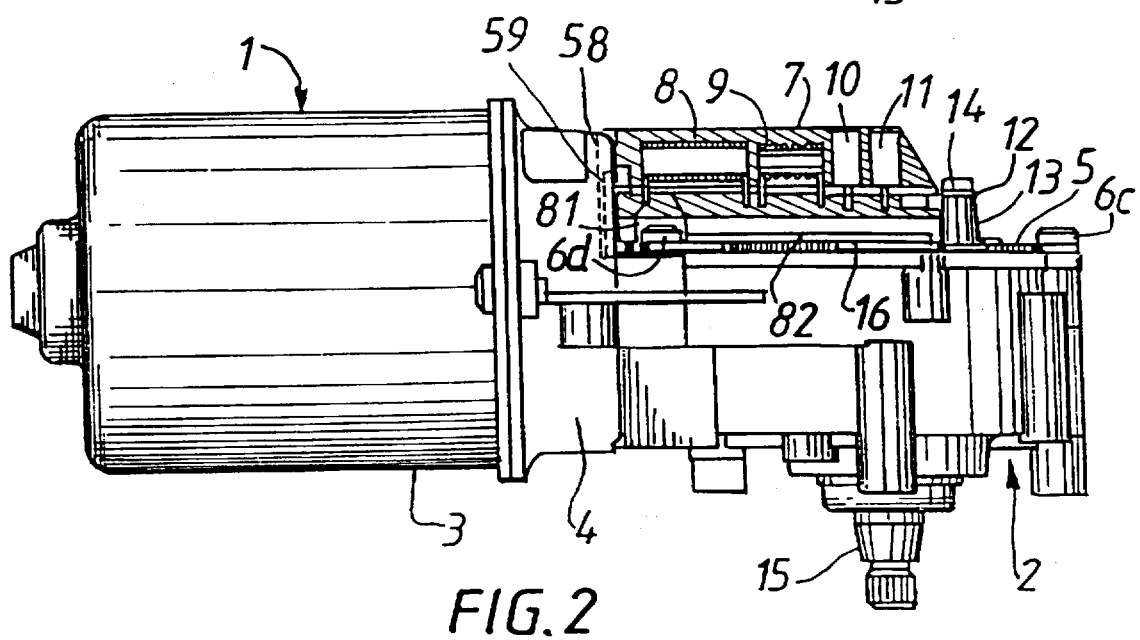
FIG. 2 is a view of the motorised reduction gear unit of FIG. 1, shown partly in cross section.

Reference is first made to FIGS. 1 and 2, which show a motorised reduction gear unit, suitable especially for driving a screen wiper apparatus. This unit comprises are electric motor 1 and reduction gearing (not shown), which is coupled to the motor and enclosed within a hollow gearbox casing 2.

The electric motor 1 has an outer case 3, generally pot-shaped, having its open end closed by an intermediate member 4 containing a support plate which carries the carbon brushes (not shown in FIGS. 1 and 2) of the motor. This intermediate member 4 is fixed to the hollow gearbox casing 2. The reduction gearing is of conventional construction, comprising two gear wheels of substantially equal diameters, which are driven in rotation by two worms carried or the rotor of the electric motor and driving a third gear wheel, the diameter of which is greater than that of the other two gear wheels. This third wheel is coupled in rotation to the output spindle 15 of the unit. The spindle 15 is coupled in the usual way to the screen wider or wipers.

The gearbox casing 2 is preferably made of a metallic material, and it is closed by a closure plate 5, which is again made of metal and which is secured to the casing 2 by means of screws 6a–6d. A suppressor housing 7, having the general form of a rectangular parallelepiped, is arranged on the outer face of the closure plate 5. The housing 7 contains suppressor components as is shown in FIG. 2. These components consist, for example, of inductive coils 8, 9 and capacitors 10, 11.

Figure 5:
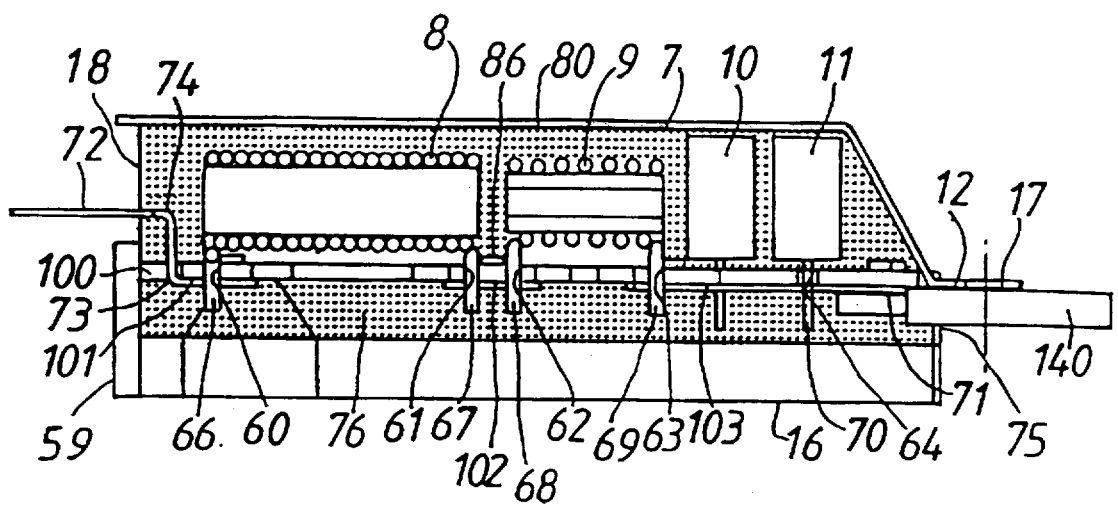
FIG. 5 is a view of the same detail as in FIG. 4, in cross section taken on the line A—A in FIG. 4.

The suppressor housing 7 has a hollow face 16 which can be seen best in FIG. 5. This is the face of the housing that lies against the closure plate 5. The hollow face 16 is made from an electrically conductive material, and in a preferred embodiment it is made by blanking and press-forming from metallic plate. In another version of this embodiment the housing 7 is made from a plastics material, with its internal surface being coated with a thin layer of metal such as aluminium, so as to render it conductive of electricity.

The suppressor housing 7 is also open in its face 18, which lies against the intermediate member, and it includes two tongues, one of which can be seen in FIGS. 2 and 5 at 59. These tongues are disposed as longitudinal extensions of the side flanks or side walls 84 and 85 of the housing 7 (see FIG. 6).

The intermediate member 4 is made of an electrically conductive material, and is preferably of metal. It has two grooves, one of which is denoted by the reference numeral 58, into which are inserted the two tongues 59 projecting from the suppressor housing 7, when the latter is fitted in place on the closure plate 5. In this way the intermediate member 4 is put into direct electrical connection with the suppressor housing 7.

The housing 7 also has a lug 12 which is integral with one of the side walls of the housing. This lug 12 has two functions: firstly it serves for fastening the housing 7 on the closure plate 5, and secondly, it provides electrical continuity between the conductive housing 7 and the metal closure plate 5. In this connection, the closure plate 5 has an upstanding support post 13, formed integrally with the plate 5 and having a threaded hole which receives a screw 14. The position and height of the support post 13 are so chosen that, when the housing 7 is located in its final position on the closure plate 5, the lug 12 lies at the same level as the upper surface of the post 13.

The lug 12 has a through hole 17, which can be seen best in FIG. 5. The screw 14 is inserted through the hole 17 before being screwed into the threaded hole in he support post 13, so that when the screw 14 has been finally tightened, the lug 12 is clamped between the support post 13 and the screw 14. The suppressor housing 7 is also fastened on the gearbox at a second fastening point, which is located opposite the lug 12 and which will described later herein.

It should be noticed that the housing 7 has a profiled portion 81 (FIG. 1) which projects on one of its side flanks or walls, namely the side wall 84, The profiled portion 81 extends around The screw 6d that fastens the closure plate 5 on the gearbox casing 2, and thereby enables the suppressor housing 7 to be positioned more easily on the closure plate.

Figure 6:
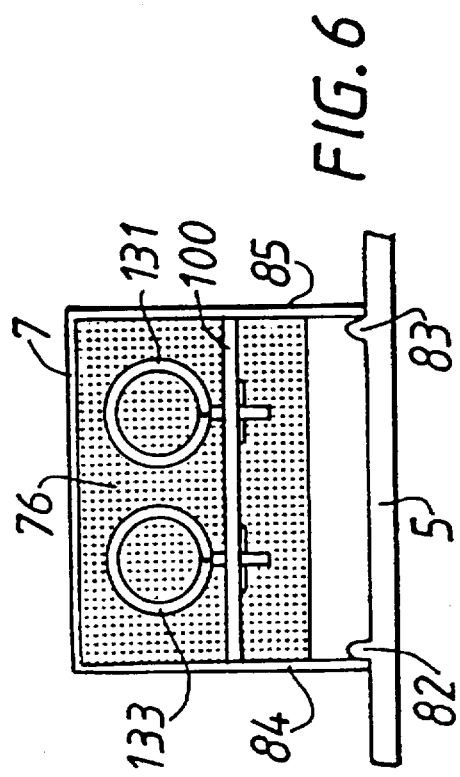
FIG. 6 is a view of the same detail as in FIG. 4, in cross section taken on the line B—B in FIG. 4.

With reference to FIG. 6, the closure plate 5 also has two rectilinear projections 82 and 83. One of these, namely the projection 82, can also be seen in FIG. 2. The projections 82 and 83 are substantially parallel to each other, and they are so disposed that, when the suppressor housing 7 is fitted in place on the closure plate 5, the two projections 82 and 83 lie within the housing 7 and against the side walls 84 and 85 respectively of the latter, so that they are in electric contact with the walls 84 and 85.

Accordingly, electrical continuity between the housing 7 and the closure plate 5 is obtained along The side walls 84 and 85 of the former. When the housing 7 is fixed on the closure plate 5, the closure plate closes off the hollow face 16 of the housing 7 and the intermediate member 4 closes off the open face 18 of the housing 7. The housing 7, the closure plate 5 and the intermediate member 4 then together constitute an electrically conductive cage of the kind known as a Faraday cage. The potential of this cage is that of the gearbox casing, that is to say the ground potential prevailing in the bodywork of the vehicle.

Electromagnetic radiation that is liable to be emitted by the suppressor components 8 to 11 while the wiper drive motor is in operation are thus trapped within this electrically conductive Faraday cage, and are therefore unable to introduce any perturbation into the environment outside the motorised reduction gear unit. The object of the invention is thus achieved.

The other elements seen in FIG. 6, which can also be seen in FIGS. 4 and 5, will be described later herein. Meanwhile, reference is made to FIG. 3, which shows diagrammatically a control module for a screen wiper apparatus.

Figure 3:
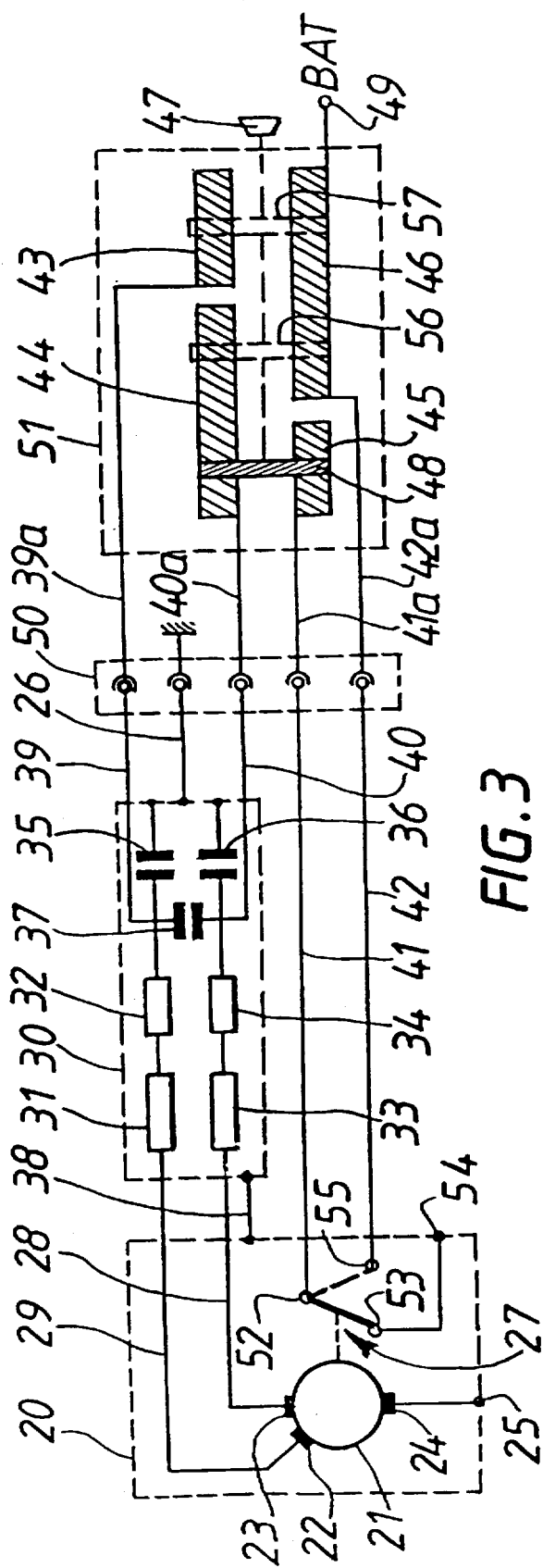
FIG. 3 is a general diagram for a control means of a screen wiper system in accordance with the invention.

In FIG. 3, the motorised reduction gear unit, which is indicated by the box 20 in broken lines, comprises an electric motor 21 which is of the kind capable of running at two different speeds, for which it is supplied with power via a carbon brush 22 for high speed, and via a carbon brush 23 for low speed. The motor 21 also has a third carbon brush 24, which is connected at 25 to the body of the casing of the motorised reduction gear unit. This body is itself connected to ground via wires 38 and 26, The box 20 in FIG. 3 also contains an interruptor 27 for controlling stopping of the motor 21. This interruptor consists, in the usual way and as is known per se, of a mechanism (not shown) that comprises wiping contacts which are arranged to cooperate with rotatable, concentric tracks, disposed on the final wheel of the reduction gearbox and rotatable with it.

The carbon brushes 23 and 22 are connected, via power supply wires 28 and 29 respectively, to module 30 corresponding to the housing 7 shown in FIGS. 1 and 2. The wire 28 is connected to two inductances 33 and 34 in series, and the wire 29 is connected to two further inductances 31 and 32 in series. The inductances 32 and 34 are connected to a first pole of a capacitor 35 and a capacitor 36 respectively. The second poles of these capacitors are connected to the body of the casing of the module 30, which is itself connected to ground via the wire 26. A further capacitor 37 is connected between the two first poles of the capacitors 35 and 36, while two wires 39 and 40, which are connected to the first pole of the capacitor 35 and to that of the capacitor 36 respectively, extend out of the module casing 30 for connection to a connector 50.

The components 31 to 37 described above perform the function of filtering electrical signals flowing in the power supply wires 28 and 29 for the electric motor 21, suppressing the emission of parasitic noise in different frequency ranges as discussed earlier herein.

The housing 30 which contains the antiparasitic components 31 to 37 is connected to the casing of the motorised reduction gear unit, indicated diagrammatically at 20 in FIG. 3, via the wire 38. Thus, the two blocks 20 and 30 are connected to ground via the wire 26, which is itself also connected to the connector 50.

It should be noted that in FIG. 3, the wires 26, 39 and 40 extending out of the block 30 correspond to the respective wires 126, 139 and 140 extending out of the suppressor housing 7 in FIG. 1.

Further wires 41 and 42 extend from the interruptor that controls stopping of the motor, and are connected to the connector 50. These wires can also be partially seen in FIG. 1 under the reference numeral 142. The group of five wires connected to the connector 50, and shown diagrammatically in FIG. 3, thus correspond to the bundle of wires which can be seen in FIG. 1 under the reference numeral 150.

The operation of the control module will now be described, with reference once again to FIG. 3. The wires 39 to 42 are connected in the connector 50 to corresponding wires 39a to 42a, which lead in turn to a group of contact pads 43 to 46, respectively, of a manual changeover switch 51.

The switch 51 has an operating knob 47 which is coupled to a conductive contact bar 48 disposed at right angles to the contact pads 3 to 46. The contact pads 43 to 46 are arranged in two lines of two pads each, with the pads 43 and 44 in one line and the pads 45 and 46 in the other. The length of the contact bar 48 is such that it can put the contact pad 44 into contact with the pad 45 or 46, and the pad 43 into contact with the pad 46.

In a first position of the contact bar 48, shown in full lines in FIG. 3, an electrical connection is made between the contact pads 44 and 45. The contact pad 44 is connected via the wires 40a and 40 to the low-speed power supply carbon brush 23 of the electric motor 21, while the contact pad 45 is connected via the wires 41a and 41 to a common pole 52 of the interruptor 27.

The interruptor 27 also has two further poles 53 and 55, arranged to be put alternately into contact with the common pole 52. This pole 52 is connected to ground on the casing of the motorised reduction gear unit at the point indicated at 54, while the pole 55 is connected to the contact pad 46 of the changeover switch 51 via the wires 42 and 42a. The contact 46 itself is connected to a source of electrical power, for example the battery 49 of the vehicle.

When the interruptor 27 establishes an electrical connection between its poles 52 and 55, the contact pad 45 is thus connected with the electrical power source 49, so that the low-speed carbon brush 23 of the electric motor 21 is supplied with power. The motor then operates at low speed. Once the interruptor 27 puts its poles 52 and 53 into contact with each other, which occurs in practice once the motor has reached the desired position in which the screen wiper has stopped, the contact pad 45 is connected to ground. The brush 23 of The motor is therefore also connected to ground, and the armature of the motor is short-circuited on itself. Accordingly, the motor stops.

The first position of the conductive bar 48 therefore corresponds to the setting of the changeover switch 51 for stopping the screen wipers.

In a second position of the contact bar 48, shown in broken lines at 56 in FIG. 3, an electrical connection is set up between the contact pads 44 and 46. Since the contact pad 46 is connected to the power supply 49 and, the contact pad 44 to the low-speed power supply brush 23 of the electric motor 21, the latter now runs at low speed. The second position of the conductive bar 48 thus corresponds to the setting of the changeover switch 51 for operation of the screen wipers at low speed.

In a third position of the bar 48, shown in broken lines at 57 in FIG. 3, an electrical connection is set up between the contact pads 43 and 46. Since the contact pad 46 is connected to the power supply 49, and the pad 43 is now connected to the high-speed power supply brush 22 of the motor 21, the latter runs now at high speed. The third position 57 of the conductive contact bar 48 thus corresponds to the setting of the changeover switch 51 for operation of the screen wipers at high speed.

Figure 4:
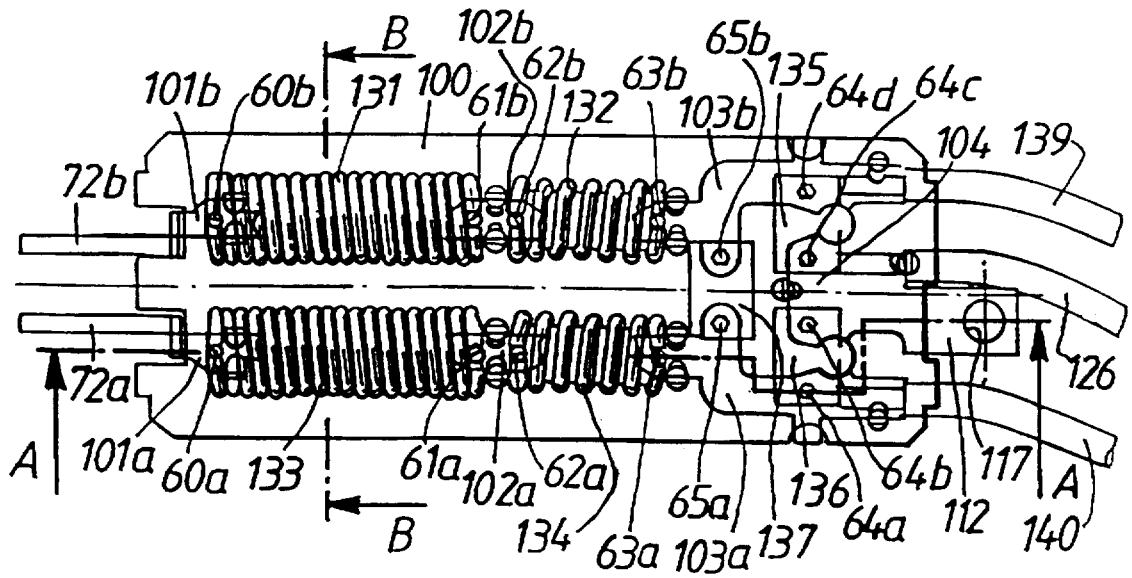
FIG. 4 is a top plan view showing a detail of FIG. 1, in which the housing containing the suppressor components is considered, for convenience, to be transparent.

With reference to FIGS. 4 and 5, the housing 7 which contains the antiparasitic suppression components will now be described in greater detail.

FIG. 5 shows the housing 7 prior to being fitted on the closure plate of the gearbox casing. The electronic components consisting of the coils 8, 9 and the capacitors 10, 11 are disposed on a mounting plate 100 which is best seen in FIG. 4. This plate 100 is substantially rectangular in shape, and is made of a suitable insulating material. The support plate 100 comprises metallic sectors 101, 102 and 103, which are applied on the face of the plate (i.e. its lowest face in FIG. 5) opposite the face of the latter on which the antiparasitic components 8, 9, 10 and 11 are disposed. The sectors 101 to 103 are secured on the support plate by crimping for example as indicated at 86.

The metallic sectors 101 to 103 can also be seen in FIG. 4, which, as already mentioned, is drawn on the supposition that the plate 100 is transparent. In FIG. 4 the sectors are shown under the reference numerals 101a, 101b, 102a, 102b, 103a, 103b and 104.

With reference to FIG. 5, the sectors 101 to 103 are formed with through holes 60 to 64, through which there pass lugs 66 to 70 of the respective antiparasitic components 8, 9 and 11. These components are secured on the support plate 100 in the following way, as described with reference to the coils 8 and 9.

The lugs 66 and 67 of the coil 8 are inserted in the holes 60 and 61, and the lugs 68 and 69 of the coil 9 are similarly inserted in the holes 62 and 63. These lugs are then vacuum soldered on to the metallic sectors 101, 102 and 103. This ensures that the two coils are secured, and that electrical connection is made between their lugs 66 to 69 and the appropriate metallic sectors. The lug 67 of the coil 8 and the lug 68 of the coil 9, both of which are joined to the metallic sector 102, are thereby connected electrically together. The capacitors 10 and 11 are fixed on the support plate 100 in the same way.

With reference to FIG. 4, this shows coils 131 and 133 which comprise turns touching each other, and which are adapted for filtering frequencies in the FM waveband and short-wave frequencies. In the functional diagram of FIG. 3 they correspond to the coils 31 and 33 that filter the signals of The power supply for the carbon brushes 22 and 23 of the electric motor.

Two further coils 132 and 134 ere also shown in FIG. 4. These have fewer turns than the coils 131 and 133, and their turns do not touch each other. The coils 132 and 134 are adapted for filtering frequencies above the FM wavebend, and correspond to the coils 32 and 34 in the functional diagram of FIG. 3.

In the same way, three capacitors 135, 136 and 137, which are shown in FIG. 4, correspond to the capacitors 35, 36 and 37 respectively in FIG. 3. In FIG. 4, the various electrical connections indicated in FIG. 3 are provided, in FIG. 4, by the metallic sectors 101a to 104 to which the lugs of the components are soldered.

Thus, the coil 131 has a first lug which is inserted in the hole 60a of the metallic sector 101b, and a second lug which is inserted in the hole 61a of the metallic sector 102b. Similarly the coil 133 has a first lug which is inserted in the hole 60a of the sector 101a, and a second lug which is inserted in the hole 61a of the sector 102a.

A first lug of the coil 132 is inserted in a second hole 62b of the metallic sector 102b, while the second lug of the coil 132 is inserted in a hole 63b of the sector 103b. In the same way a first lug of the coil 134, is inserted in a second hole 62a of the sector 102a, and the second lug of the coil 134 is inserted in a hole 63a of the sector 103a.

The metallic sector 103b has a second hole 65b, in which a first lug of the capacitor 137 is inserted, the second lug of the same capacitor being inserted in a second hole 65a of the metallic sector 103a.

The capacitor 135 has a first lug inserted in a third hole 64d of the metallic sector 103b, and a second lug inserted in a hole 64c of the metallic sector 104, while the capacitor 136 has a first lug inserted in a third hole 64a of the sector 103a, and a second lug inserted in a hole 64b of the sector 104.

The metallic sector 104 thus connects electrically together the second lugs of the two capacitors 138 and 136, and it is itself in electrical contact with the grounding lug 12 of the housing 7 on the closure plate of the gearbox casing.

In this connection, the metallic sector 104 is extended beyond the insulating support plate 100 by a lug 112, the form and size of which are identical to those of the lug 12 of the housing 7. This lug 112 has a hole 117 of the same diameter as the hole 17 in the lug 12. It is also arranged that, when the mounting plate 100 is in place in the housing 7, in the final stage of its fitting operation the lug 112 and the lug 12 will be in contact with each other over their whole surface area, with the holes 17 and 117 concentric with each other.

Thus, when the housing 7 is fixed, through the lug 12, to the support post 13 of The closure plate 5, it is in fact the lug 12 and the lug 112 that are clamped together between the support post and the head of the screw 14. The metallic sector 104, extended by the lug 112, is then in electrical contact with ground, taken on the closure plate of the gearbox casing.

In addition, wires 139, 126 and 140 are soldered to the metallic sectors 103b, 104 and 103a respectively; and these wires (which correspond to the wires 39, 26 and 40 respectively in FIG. 3) are taken from there to the connector 50 mentioned above with reference to FIG. 3.

Of these three wires, only the wire 140 can be seen in FIG. 5. The wire 140 is soldered at 71 to the metallic sector 103, which is itself situated at one end of the mounting plate 100 which carries the antiparasitic components. The metallic sector 101 (which corresponds to the sectors 101a and 101b in FIG. 4) is disposed at the other end of the mounting plate 100. The sector 101 is extended by a tongue 72 which has two bends 73 and 74, whereby the tongue 72 is so configured that it projects out of the housing 7 above the level of the mounting plate 100 with reference to FIG. 5).

With reference to FIG. 4, it may be noted that there are in fact two of these tongues, 72a and 72b, which are extensions of the metallic sectors 101a and 101b respectively. These tongues 72a and 72b are arranged to be connected to the power supply wires 28 and 29 for the carbon brushes of the electric motor 21, seen in FIG. 3.

The process for assembling the housing 7 of FIG. 5 will now be described. The metallic sectors 101a to 104 are first fixed on the mounting plate 100 by a seaming operation. The various antiparasitic components are then soldered to the metallic sectors of the mounting plate 100 as previously described. Finally, the wires 126, 139, 140 are soldered to the metallic sectors 104, 103b and 103a respectively, for connection with the control system. The mounting plate 100, as it exists at this stage of assembly, is as shown in FIG. 4.

The next step consists in inserting the mounting plate, carrying the various components now fixed to it, into the housing 7, with the antiparasitic components extending towards the roof 80 of the housing, and oriented so that their lugs are directed towards its open face 16. It should be noted that the thickness of the housing 7 is broadly greater than that of the mounting plate 100 in combination with the various components fixed to it. in addition, an aperture 75 (which is shown in FIGS 1 and 5) is provided at one end of the housing 7, and the connecting wires 126, 139 and 140 are passed through this aperture. Another aperture (not shown), through which the tongues 72a and 72b are passed, is provided at the other end of the housing 7. The mounting plate 100 is positioned inside the housing 7 in such a way that the lug 112, extending beyond the plate 100, comes into engagement on the lug 12 of the housing.

The interior of the housing 7 is then filled with an insulating resin 76 until the plate 100 and the components carried by it, i.e. the antiparasitic components including their lugs, are encapsulated in the resin. The resin has two main functions: firstly, that of holding the plate 100 and the components carried by it in place in the housing, and secondly, that of sealing the whole suppressor unit comprising the housing 7 and its contents. At this stage in the assembly process, the suppressor unit, as is shown in FIG. 5, is complete and ready to be fitted on the closure plate 5 of the gearbox casing.

The housing 7 is secured on the closure plate 5, firstly by the lug 12 and the lug 112, which are screwed on to the support post 13 as already described above, and secondly by the tongues 72a and 72b, which are inserted into an aperture in the intermediate member 4, after which they are soldered on to the support plate (not shown) that carries the carbon brushes. The tongues 72a and 72b are soldered in such a way that electrical continuity is obtained between each of the two tongues and each of the respective carbon brushes, i.e. the low-speed and high-speed power supply brushes of the electric motor. The effect is to achieve the electrical connections represented by the wires 28 and 29 in FIG. 3.

The suppressor unit which consists of the housing 7 with its contents including the antiparasitic components, as has just been described, also has the advantage that it is readily incorporated in a motorised reduction gear unit, because it is assembled entirely independently and is only fixed on the motorised reduction gear unit at the final stage of assembly of the latter.

It will of course be understood that the product according to the invention is in no way limited to the embodiment particularly described in the foregoing. Any desirable modification may be made to its design without thereby departing from the ambit of the present invention.

What is claimed is:

1. A motorized reduction gear unit for a vehicle screen wiper apparatus, comprising:

a hollow gearbox casing having an open side;

a closure plate closing said open side of the gearbox casing and having an external surface, at least a portion of said external surface being electrically conductive;

a group of electronic components disposed on said conductive portion of said closure plate external surface;

a housing in the general form of a cap overlying and flanking said group of components, said housing comprising electrically conductive material and at least one connecting means for electrical connection with said conductive portion of said closure plate external surface; and a mounting plate of electrically insulating material and carrying said group of components, said mounting plate having a plurality of metallic sectors defining electrical connections between components in said group.

2. A unit according to claim 1, wherein the closure plate is of metallic material.

3. A unit according to claim 1, wherein the said housing is of metallic material.

4. A unit according to claim 1, wherein the said housing is of a synthetic material and includes a thin layer of electrically conductive material disposed on a surface thereof.

5. A unit according to claim 4, wherein the said surface having the layer of conductive material is an internal surface of the housing.

6. A unit according to claim 1, wherein the mounting plate is inside the said housing, and further comprising an insulating resin filling the housing and encapsulating the mounting plate and said group of components.

7. A unit according to claim 6, wherein a said metallic sector includes a second lug extending that sector and defining a hole therein, the unit further comprising means electrically connecting the said second lug with the said housing.

8. A unit according to claim 7, wherein the said housing includes at least one first lug of electrically conductive material projecting from the housing, and means securing said first lug to the said conductive portion of the closure plate external surface whereby to connect the housing electrically to said conductive portion, and wherein the closure plate further includes a support post projecting from said conductive portion of its external surface, the unit further including a fastening screw, the support post defining a hole therein for receiving said screw, and the said first lug having a hole therein, the screw passing through the holes in said first and second lugs and being secured in the hole in the support post, so that one said lug is in contact with the other, the lugs being clamped between the screw and the support post.

9. A unit according to claim 1, further including an electric motor having a hollow motor casing defining an open end thereof, the motor further including power supply brushes; an intermediate member closing the open end of the motor casing and being joined to the gearbox casing; a support plate contained in the intermediate member and carrying said brushes; and a tongue defining an extension of at least one said metallic sector of the mounting plate, the tongue projecting beyond he said mounting plate, and the intermediate member defining a hole therein, said tongue being received in said hole in the intermediate member and soldered to said support plate.

10. A unit according to claim 1, further including: a two-speed electric motor including a high-speed power supply brush and a low-speed power supply brush; a support plate carrying said brushes; an intermediate member fixed to the motor and joined to the gearbox casing, the intermediate member defining at least one hole therein adjacent to the said support plate; and two tongues, each defining an extension of a respective one of two said metallic sectors of the mounting plate and projecting beyond the mounting plate, with each said tongue being inserted in a said hole in the intermediate member and being soldered to said support plate, whereby each tongue is connected electrically with a respective said brush.

11. A motorized reduction gear unit for a vehicle screen wiper apparatus, comprising:

a hollow gearbox casing having an open side;

a closure plate closing said open side of the gearbox casing and having an external surface, at least a portion of said external surface being electrically conductive;

a group of electronic components disposed on said conductive portion of said closure plate external surface;

a housing in the general form of a cap overlying and flanking said group of components, said housing comprising electrically conductive material and at least one connecting means for electrical connection with said conductive portion of said closure plate external surface, wherein said housing has at least one side wall, and at least one rectilinear projection of electrically conductive material disposed on said conductive portion of said closure plate external surface and in contact with said at least one side wall of said housing, thereby connecting said housing electrically with said conductive portion.

12. A unit according to claim 11, wherein the said housing has at least two side walls, the closure plate having two said rectilinear projections substantially parallel to each other and in contact with two said side walls of the housing.

13. A unit according to claim 12, wherein the said rectilinear projections are inside the said housing.

14. A motorized reduction gear unit for a vehicle screen wiper apparatus, comprising:

a hollow gearbox casing having an open side;

a closure plate closing said open side of the gearbox casing and having an external surface, at least a portion of said external surface being electrically conductive;

a group of electronic components disposed on said conductive portion of said closure plate external surface;

a housing in the general form of a cap overlying and flanking said group of components, said housing comprising electrically conductive material and at least one connecting means for electrical connection with said conductive portion of said closure plate external surface, wherein said housing includes at least one first lug of electrically conductive material projecting from said housing, and means securing said first lug to said conductive portion of said closure plate external surface whereby to connect said housing electrically to said conductive portion.

* * * * *